United States Patent
Nakayama et al.

(10) Patent No.: US 7,687,431 B2
(45) Date of Patent: Mar. 30, 2010

(54) NANOTUBE-SHAPED TITANIA AND PROCESS FOR PRODUCING THE SAME

(75) Inventors: Keisuke Nakayama, Yokohama (JP); Takaya Kubo, Yokohama (JP); Yoshinori Nishikitani, Yokohama (JP); Hideki Masuda, Kawasaki (JP)

(73) Assignees: Nippon Oil Corporation, Tokyo (JP); Kanagawa Academy of Science and Technology, Kanagawa (JP)

( * ) Notice: Subject to any disclaimer, the term of this patent is extended or adjusted under 35 U.S.C. 154(b) by 140 days.

(21) Appl. No.: 11/532,263

(22) Filed: Sep. 15, 2006

(65) Prior Publication Data

US 2010/0006134 A1     Jan. 14, 2010

Related U.S. Application Data

(63) Continuation of application No. PCT/JP2005/005645, filed on Mar. 22, 2005.

(30) Foreign Application Priority Data

Mar. 19, 2004    (JP)    ............................. 2004-080653

(51) Int. Cl.
| | |
|---|---|
| *B01J 23/00* | (2006.01) |
| *B01J 23/08* | (2006.01) |
| *B29D 22/00* | (2006.01) |
| *B29D 23/00* | (2006.01) |
| *C01G 23/047* | (2006.01) |
| *B31B 45/00* | (2006.01) |
| *B32B 1/08* | (2006.01) |
| *B32B 27/10* | (2006.01) |
| *B28B 11/00* | (2006.01) |
| *B28B 21/00* | (2006.01) |
| *B28B 21/72* | (2006.01) |
| *B28B 23/08* | (2006.01) |
| *B28B 23/00* | (2006.01) |

(52) U.S. Cl. .................... 502/355; 428/34.1; 428/34.4; 428/34.5; 423/610; 423/611; 423/612; 977/810; 977/811; 977/813; 977/832; 977/948

(58) Field of Classification Search ................. 502/355; 977/810, 811, 823, 832, 948; 428/34.1, 34.4, 428/34.5; 423/610–612
See application file for complete search history.

(56) References Cited

U.S. PATENT DOCUMENTS 3,840,442 A * 10/1974 Chevalier et al. ............. 205/50

(Continued)

FOREIGN PATENT DOCUMENTS

CN    1528673    *    9/2004

(Continued)

OTHER PUBLICATIONS

"Titania Nanotubes Prepared by Chemical Processing," Tomoko Kasuga et al. Adv. Mater. 1999, vol. 11, No. 15, pp. 1307-1311.*

(Continued)

*Primary Examiner*—Patricia L Hailey
(74) *Attorney, Agent, or Firm*—Panitch Schwarze Belisario & Nadel LLP

(57) ABSTRACT

A nanotube-shaped titania having an aspect ratio of 6 or greater can be produced by anodizing a titanium metal or an alloy containing mainly titanium in an electrolyte solution containing a halogen atom-containing ion, such as a perchloric acid aqueous solution.

11 Claims, 4 Drawing Sheets

U.S. PATENT DOCUMENTS

| | | | | |
|---|---|---|---|---|
| 6,027,775 | A | * | 2/2000 | Kasuga et al. ............... 428/34.1 |
| 6,036,774 | A | * | 3/2000 | Lieber et al. ................. 117/105 |
| 6,630,062 | B1 | * | 10/2003 | Anderson et al. ........... 204/429 |
| 7,011,737 | B2 | * | 3/2006 | Varghese et al. ............ 205/189 |
| 7,070,706 | B2 | * | 7/2006 | Chu et al. .................. 252/62.2 |
| 7,208,327 | B2 | * | 4/2007 | Gstrein et al. ................. 438/10 |
| 2005/0103639 | A1 | * | 5/2005 | Lu et al. ..................... 205/322 |
| 2006/0193766 | A1 | * | 8/2006 | Hasegawa et al. ........... 423/610 |

FOREIGN PATENT DOCUMENTS

| | | | |
|---|---|---|---|
| CN | 1884630 | * | 12/2007 |
| EP | 0 832 847 | A1 | 4/1998 |
| JP | 60-056096 | A | 4/1985 |
| JP | 02-073997 | A | 3/1990 |
| JP | 06-235091 | * | 8/1994 |
| JP | 10-152323 | A | 6/1998 |
| JP | 2003-251194 | A | 9/2003 |
| JP | 2006-240967 | * | 9/2006 |
| JP | 2006-260991 | * | 9/2006 |
| WO | 2006/116752 | * | 11/2006 |

OTHER PUBLICATIONS

"Formation of Titanium Oxide Nanotube," Tomoko Kasuga et al. Langmuir 1998, 14, pp. 3160-3163.*

"Hydrothermal Synthesis of Titania Nanotube and its Application for Dye-Sensitized Solar Cell," S. Uchida et al. Studies in Surface Science and Catalysis 146, pp. 791-794.*

"Fabrication of titanium oxide nanotube arrays by anodic oxidation," Jianling Zhao et al. Solid State communications 134 (2005), pp. 705-710.*

"Low temperature hydrothermal formation of a net like structure TiO2 film and its performance of photogenerated cathode protection," Hong Yun et al. Applied Surface Science xxx (2008), pp. 1-5.*

"Dye-sensitized anodic TiO2 nanotubes," Jan M. Macak et al. Electrochemistry Communications 7 (2005), pp. 1133-1137.*

"Self-organized TiO2 nanotubes prepared in an ammonium fluoride containing acetic acid electrolytes," Hiroaki Tsuchiya et al. Electrochemistry Communications 7 (2005), pp. 576-580.*

Masuda et al., "Fabrication of Porous TiO2 Films Using Two-Step Replication of Microstructure of Anodic Alumina", *Jpn. J. Appl. Phys.*, vol. 31, pp. L1775-L1777 (1992).

Antonelli, "Synthesis of phosphorus-free mesoprous titania via templating with amine surfactants", *Microporous and Mesoporous Materials*, vol. 30, pp. 315-319 (1999).

Lakshmi et al., "Sol-Gel Template Synthesis of Semiconductor Nanostructures", *Chem. Mater.*, vol. 9, pp. 857-862 (1997).

Adachi et al., "Formation of Titania Nanotubes with High Photo-Catalytic Activity", *Chemistry Letters*, pp. 942-943 (2000).

Gong et al., "Titanium oxide nanotube arrays prepared by anodic oxidation", *J. Mater. Res.*, vol. 16, No. 12, pp. 3331-3334 (2001).

Gopal K. Mor, et al, "A room-temperature TiO2-nanotube hydrogen sensor able to self-clean photactively from environmental contamination," Journal of Materials Research Mater Res. Soc USA, vol. 19, No. 2, pp. 628-634 (Feb. 2004)

Oomman K. Varghese, et al., "Hydrogen sensing using titania nanotubes," Sensors and Actuators B, Elsevier Sequoia S.A., Lausanne, CH, vol. 93, No. 1-3, pp. 338-344 (Aug. 1, 2003).

MD. K. Nazeeruddin, et al., "Efficient panchromatic sensitization of nanocrystallien TiO2 films by a black dye based on a trithiocyanato-ruthenium complex," chemical Communications - Chemcom, Royal Society of Chemistry, GB, pp. 1705-1706, XP002156368, ISSN: 1359-7345 (Jan. 1, 1997).

* cited by examiner

NANOTUBE-SHAPED TITANIA AND PROCESS FOR PRODUCING THE SAME

CROSS-REFERENCE TO RELATED APPLICATIONS

This application is a Continuation of International Application No. PCT/JP2005/005645, filed Mar. 22, 2005, which was published in the Japanese language on Sep. 29, 2005, under International Publication No. WO 2005/090236 A1 and the disclosure of which is incorporated herein by reference.

BACKGROUND OF THE INVENTION

The present invention relates to a nanotube-shaped titania and a process for producing such a nanotube-shaped titania.

Titania has excellent properties such as ultraviolet absorbability, adsorbability and the like, and thus has been widely used as a material for pigments, paints, cosmetics, ultraviolet shielding agents, catalysts, catalyst supports, and various electronics components. Further, recently considerable attention has been paid to the photocatalytic activity and amphipathic properties of titania exhibited when titania absorbs ultraviolet light. It has been confirmed that titania is effective in decomposing hazardous organic substances, eliminating air pollutants, sterilizing, and self-cleaning.

As one of the conventional technologies for improving these properties of titania, the increase of the specific surface area thereof has been studied. Many attempts have been made to increase the specific surface area of titania, for example, by forming titania into nano-scale fine particles, flakes, wires, tubes, or porous bodies.

Titania particularly in the shape of wire, tube, or porous body such as honeycomb structure can decrease the scattering of titania fine particles at grain boundaries occurring when electrons, holes, photons, or composites thereof produced in the titania upon responding to external stimulus such as heat, light, or temperature change propagate through the titania, more than titania in the shape of fine particle or agglomerate thereof. Therefore, a great number of studies have been carried out on the process for producing titania in the shape of wire, tube, or porous body. For example, Kasuga et al. (Patent Document 1 below) reported that nanotube titania is produced by treating titania particles in a highly concentrated alkali. Furthermore, attempts have been made wherein the shape of titania is controlled by allowing titania to coexist with a substance such as a surfactant which functions as a mold, during the growing process of the titania particles (see Non-Patent Documents 1 to 4 below). However, the conventional processes can not attain titania of a precisely formed structure and have a problem in improving the productivity as well.

Alternatively, as one of the processes for producing titania, there is known a process wherein titanium is anodized. Anodization is a process for producing titania wherein titanium is electrochemically oxidized by applying voltage to an anode of titanium and a cathode of any electrically conductive material in an aqueous solution, thereby forming an oxide of titanium, i.e., titania on the surface of the titanium anode. The process has advantages that it can form the titania film more rapidly than conventional processes and uniformly even though the titanium anode has a large area. Recently, Grimes et al. reported that titania nanotube arrays were produced by anodizing a titanium metal in hydrofluoric acid (see Non-Patent Document 5 below). However, this process is satisfactory in productivity and structural uniformity but not satisfactory in aspect ratio defined as the ratio of the length to diameter of the resulting titania, which is less than 6.

(1) Patent Document 1: Japanese Patent Laid-Open Publication No. 10-152323
(2) Non-Patent Document 1: Japanese Journal of Applied Physics, 2001, vol. 31, p. L1775-L1777, by H. Masuda et al
(3) Non-Patent Document 2: Microporous and Mesoporous Materials (U.S.A), 1999, vol. 30, p. 315-319 by D. M. Antonelli,
(4) Non-Patent Document 3: Chemistry of Materials, (U.S.A), 1997, vol. 9, p. 857-862 by R. Martin
(5) Non-Patent Document 4: Chemistry Letters 2000, p. 942-943, by M. Adachi et al
(6) Non-Patent Document 5: Journal of Materials Research, (U.S.A), 2001, vol. 16, p. 3331-3334 by C. A. Grimes

BRIEF SUMMARY OF THE INVENTION

The present invention was achieved in view of these situations and provides a nanotube-shaped titania which is uniform in structure and excellent in commercial productivity and has a sufficient aspect ratio.

That is, the present invention relates to a nanotube-shaped titania with an aspect ratio of 6 or greater, obtained by anodizing a titanium metal or an alloy mainly containing titanium.

The present invention also relates to the titania wherein the tube diameter thereof is from 5 to 500 nm.

The present invention also relates to a process for producing a nanotube-shaped titania with an aspect ratio of 6 or greater, wherein a titanium metal or an alloy containing mainly titanium is anodized in an electrolyte solution containing a halogen atom-containing ion.

Furthermore, the present invention relates to the process wherein the anodization is carried out in the coexistence of a water-soluble titanium compound in the electrolyte solution containing a halogen atom-containing ion.

Furthermore, the present invention relates to the process wherein the anodization is carried out in the coexistence of an acid compound different from an acid or salt forming the halogen atom-containing ion, in the electrolyte solution containing a halogen atom-containing ion.

Still furthermore, the present invention relates to the process wherein the anodization is carried out in the coexistence of titania fine particles in the electrolyte solution containing a halogen atom-containing ion.

Still furthermore, the present invention relates to the process wherein the electrolyte solution is a perchloric acid aqueous solution.

The present invention also relates to a process of producing titania with improved crystallinity, wherein the titania produced by any of the foregoing processes is heated at a temperature of 100 to 1200° C. for 10 to 500 minutes.

The present invention also relates to a catalyst wherein the aforesaid titania is used as a catalyst or a catalyst support.

Furthermore, the present invention relates to the catalyst wherein it is a photocatalyst.

The present invention also relates to a photoelectric conversion device wherein the aforesaid titania is used as an electrode material.

Furthermore, the present invention relates to the photoelectric conversion device wherein a dye is adsorbed on the surface of the titania.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
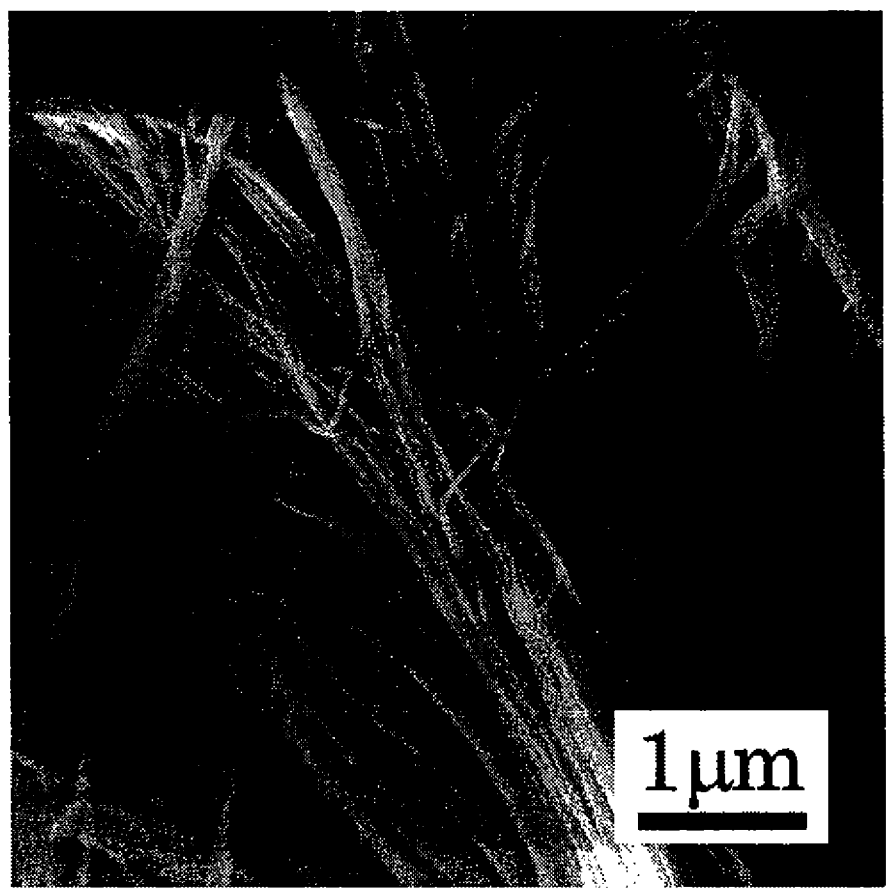
FIG. 1 is a photograph of the titania nanotube obtained in Example 1, taken with a scanning electron microscope.

The present invention will be described in more detail.

The titania of the present invention has a nanotube shape and an aspect ratio of 6 or greater.

The nanotube-shaped titania with an aspect ratio of 6 or greater of the present invention can be produced by anodizing a titanium metal or an alloy containing mainly titanium in the following manner.

Anodization carried out in the present invention is a technique wherein a voltage is applied to an anode made of titanium or an alloy thereof and a cathode made of any electrically conductive material in an electrolyte so as to form an oxide of titanium on the anode. During the anodization, titanium or an alloy thereof only needs to be the anode at least once. The anodization includes a case wherein titanium or an alloy thereof is to be the anode and the cathode alternately.

Titanium and an alloy thereof used in the present invention may be any commercially pure titanium the quality of which is modified with oxygen, iron, nitrogen, or hydrogen, or any low-alloy titanium with a certain degree of press-moldability. Examples of such titanium and alloys include various commercially pure titanium of JIS classes 1 to 4, titanium alloys with anticorrosion properties improved by adding nickel, ruthenium, tantalum, palladium, or the like, and titanium alloys containing aluminum, vanadium, molybdenum, tin, iron, chromium, niobium, or the like. The titanium alloy used herein denotes an alloy containing 50 percent or more of titanium.

Examples of the shape of titanium or an alloy thereof include, but not limited to, various shapes such as plates, rods, and meshes, and films of titanium or an alloy thereof formed by allowing it to grow on the surface of a different type of electrically conductive material in the shape of plates, rods, or meshes or on the surface of a semiconductor or an insulative material in the shape of plates, rods, or meshes. There is no particular restriction on the smoothness of titanium or an alloy thereof because the anodization enables titania to grow on the titanium or alloy thereof even though having a complicated surface structure.

The electrolyte solution used for the anodization is required to be capable of dissolving titanium or an alloy thereof when anodically polarized and necessarily contains a halogen-containing ion. The halogen-containing ion used herein is an ion containing any of fluorine, chlorine, bromine, and iodine atoms. Specific examples of the halogen-containing ion include fluoride ion, chloride ion, bromide ion, iodide ion, chlorate acid ion, bromate ion, iodine ion, chlorate ion, bromite ion, hypochlorite ion, hypobromite ion, and hypoiodite ion. These ions may be used individually or in combination.

Specific examples of the electrolyte solution containing any one or more of these ions include aqueous solutions containing an acid or a salt forming any of these ions. The concentration of the acid or the salt is preferably from 0.001 to 50 percent by volume, more preferably from 0.005 to 10 percent by volume, and further more preferably from 0.01 to 5 percent by volume.

In the present invention, the electrolyte solution is preferably a perchloric acid aqueous solution.

The anodization is generally carried out at an applied voltage in the range of 5 to 200 V and preferably 10 to 100 V and an current density in the range of 0.2 to 500 mA/cm$^2$ and preferably 0.5 to 100 mA/cm$^2$ for one minute to 24 hours and preferably 5 minutes to 10 hours.

The temperature of the electrolyte solution upon anodization is in the range of preferably 0 to 50° C. and more preferably 0 to 40° C.

The electrolyte solution may contain a water-soluble titanium compound. In general, the water-soluble titanium compound produces titania when it is hydrolyzed in an aqueous solution. Therefore, the electrolyte solution containing the water-soluble titanium compound can increase the aspect ratio of the resulting titania because titania produced by hydrolysis is formed on the surface of titania produced by the anodization and thus can prevent the titania from dissolving in the electrolyte solution again.

Examples of the water-soluble titanium compound include, but not limited to, titanium alkoxides such as titanium isopropoxide, titanium trichloride, titanium tetrachloride, titanium fluoride, ammonium tetrafluorotitanate, titanium sulfate, and titanyl sulfate. The concentration of the water-soluble titanium compound when expressed by the molar ratio thereof to the halogen atom-containing ion is in the range of preferably 0.001 to 1000, more preferably 0.01 to 50, and further more preferably 0.04 to 5.

Furthermore, the electrolyte solution may contain an acid compound which is different from the above-described acid or salt forming the halogen atom-containing ion. The acid compound can adjust the rate of the anodization, for example facilitate or suppress the anodization.

Examples of the acid compound include, but not limited to, the aforesaid halides or acids of oxidant ions thereof, sulfuric acid, nitric acid, acetic acid, hydrogen peroxide, oxalic acid, phosphoric acid, chromic acid, and glycerophosphoric acid. The concentration of the acid compound when expressed by the molar ratio thereof to the halogen atom-containing ion is in the range of preferably 0.001 to 1000, more preferably 0.01 to 50, and further more preferably 0.04 to 5.

The electrolyte solution may contain titania fine particles. The titania fine particles can prevent the produced titania from dissolving in the electrolyte solution and increase the aspect ratio of the titania.

The titanium fine particles are those with a particle size of preferably 0.5 to 100 nm and more preferably 2 to 30 nm. Specific examples include those produced from titanium ore by a liquid phase method and those synthesized by a vapor phase method, a sol-gel method, or a liquid phase growth method. "Vapor phase method" herein referred to is a method wherein titania is produced by hydrolyzing a titanium ore with a strong acid such as sulfuric acid or the like and calcining the resulting hydrous titanium oxide at a temperature of from 800 to 850° C. "Liquid phase method" herein referred to is a method wherein titania is produced by contacting titanium chloride with oxygen and hydrogen. "Sol-gel method"

herein referred to is a method wherein titania is produced by hydrolyzing a titanium alkoxide in an alcohol aqueous solution to form a sol, adding a hydrolytic catalyst to the sol, allowing the mixture to stand for gelatinization, and calcining the gel. "Liquid phase growth method" herein referred to is a method wherein titania is produced by hydrolyzing titanium fluoride, ammonium tetrafluorotitanate, or titanyl sulfate.

The nanotube-shaped titania with an aspect ratio of 6 or greater can be produced by anodizing a titanium metal or an alloy mainly containing titanium in the above-described manner. The aspect ratio means the ratio of the length of the titania to the diameter of the titania. The process of the present invention can produce a nanotube-shaped titania with an aspect ratio of 6 or greater, preferably 10 or greater, more preferably 20 or greater, and further more preferably 30 or greater.

The diameter of the nanotube-shaped titania of the present invention varies depending on the production conditions or the like, but is in the range of usually 5 to 500 nm, and preferably 10 to 300 nm. The length also varies depending on the production conditions, but is in the range of usually 0.1 to 100 μm and preferably 0.9 or 1 to 50 μm.

If necessary, the resulting nanotube-shaped titania may be subjected to a post treatment such as heating, steam treatment, or ultraviolet irradiation so as to allow the crystalline structure (anatase, rutile, brookite, and mixed crystal thereof) to grow. For example, it is expected that the crystallinity of the titania is improved by heating at a temperature of from 100 to 1200° C. for 10 to 500 minutes and preferably at a temperature of 300 to 800° C. for 30 to 160 minutes. None of these treatments decomposes the structure of the titania.

The nanotube-shaped titania produced by the above-described process may be used as a catalyst or a catalyst support. The nanotube-shaped titania of the present invention is remarkably large in specific surface area and highly efficient in the propagation of electrons, holes, phonons, or complexes thereof due to its shape, compared with spherical titania. Therefore, when the nanotube-shaped titania is used as an ultraviolet absorber, a masking agent, an adsorbent, or a photoactive catalyst in particular, significant improvements in the working effects thereof can be expected, compared with the prior art. When the nanotube-shaped titania is used as a catalyst support, it may be generally used, loading thereon a metal such as platinum, nickel, or silver.

Alternatively, the nanotube-shaped titania exhibits the n-type semiconductor characteristics and thus can be used as a material with rectification properties such as a transistor by forming a p-type nanowire or nanotube with excellent electron transfer characteristics and allowing the contact point of these two different nano-structures to function as a pn junction.

Alternatively, the titania of the present invention can be used as a nonlinear optical element because the wavelength conversion of light occurs when nano-scale materials are arranged with regularity. Further alternatively, the titania can be used as various optical materials such as color materials because of its peculiar optical properties.

The titania of the present invention is large in specific surface area and efficient in the propagation of electrons and thus can be used as an electrode material for a solar battery. For example, in a dye-sensitized solar battery, the titania of the present invention may be coated on the electrically conductive film of the electrically conductive film-coated glass so as to form a titania layer, and then a dye is supported thereon so as to improve the photoelectric conversion efficiency, i.e., efficiency in converting solar energy to electric energy.

Examples of the electrically conductive film of the electrically conductive film-coated glass include those formed of a metal oxide obtained by doping an oxide of metal such as tin or zinc with a trace amount of a different metal element, such as Indium Tin Oxide (ITO ($In_2O_3$:Sn)), Fluorine doped Tin Oxide (FTO ($SnO_2$:F)), and Aluminum doped Zinc Oxide (AZO (ZnO:Al)).

Examples of dyes which are preferably used in the present invention include metal complex dyes, organic dyes, and natural dyes. The dye is preferably any of those containing in their molecule a functional group such as carboxyl, hydroxyl, sulfonyl, phosphonyl, carboxyalkyl, hydroxyalkyl, sulfonylalkyl and phosphonylalkyl groups. Examples of the metal complex dye include complexes of ruthenium, osmium, iron, cobalt, zinc and mercury (mercurochrome), metal phthalocyanines, and chlorophyll. Examples of the organic dyes include, but not limited to, cyanine dyes, hemicyanine dyes, merocyanine dyes, xanthene dyes, triphenylmethane dyes, and metal-free phthalocyanines. Generally, one or more of the various semiconductors, one or more of the metal complex dyes and one or more of the organic dyes may be mixed in order to widen the photoelectric conversion wavelength region as much as possible and enhance the photoelectric conversion efficiency. The dyes to be mixed and the ratio thereof may be selected in conformity with the wavelength of the target light source and light intensity distribution thereof. Preferred examples of semiconductors which may be used as a dye include i-type amorphous semiconductors and direct transition type semiconductors, having a large absorptivity coefficient, and particle semiconductors exhibiting a quantum size effect and absorbing visible light efficiently.

The dye may be adhered to the titania by spray- or spin-coating thereon a solution obtained by dissolving the dye in a solvent and then drying out the solvent. In this case, the substrate, i.e., film may be heated to an appropriate temperature. Alternatively, the electrically conductive film may be dipped into such a solution so that the dye is adsorbed thereto. There is no particular restriction on dipping time as long as the dye is sufficiently adsorbed to the film. However, the dipping time is preferably from 10 minutes to 30 hours, and particularly preferably 10 minutes to 20 hours. If necessary, the film or solvent may be heated before dipping. The concentration of the dye in the solution is from 1 to 1000 mmol/l, and preferably from 10 to 500 mmol/l.

There is no particular restriction on the solvent which may be used in the present invention. However, water and an organic solvent are preferably used. Examples of the organic solvent include alcohols such as methanol, ethanol, 1-propanol, 2-propanol, 1-butanol, 2-butanol and t-butanol, nitrile-based solvents such as acetonitrile, propionitrile, methoxypropionitrile and glutanitrile, ketones such as benzene, toluene, o-xylene, m-xylene, p-xylene, pentane, heptane, hexane, cyclohexane, acetone, methyl ethyl ketone, diethyl ketone and 2-butanone, diethyl ether, tetrahydrofuran, ethylene carbonate, propylene carbonate, nitromethane, dimethylformamide, dimethylsulfoxide, hexamethylphosphoramide, dimethoxyethane, γ-butyrolactone, γ-valerolactone, sulfolane, adiponitrile, methoxyacetonitrile, dimethylacetoamide, methylpyrrolidinone, dimethylsulfoxide, dioxolane, trimethyl phosphate, triethyl phosphate, tripropyl phosphate, ethyldimethyl phosphate, tributyl phosphate, tripentyl phosphate, trihexyl phosphate, triheptyl phosphate, trioctyl phosphate, trinonyl phosphate, tridecyl phosphate, tris(trifluoromethyl)phosphate, tris(pentafluoroethyl)phosphate, triphenylpolyethylene glycol phosphate, and polyethylene glycol.

The process according to the present invention can produce a nanotube-shaped titania which is excellent in commercial productivity and uniform in structure, and has a sufficient aspect ratio.

The nanotube-shaped titania of the present invention is expected to be used in various applications on the basis of its various characteristics such as propagation properties for electrons, holes, phonons, and complexes thereof, magnetic properties, optical properties, chemical catalytic properties, and the like.

The present invention will be described in more details with reference to the following examples but is not limited thereto.

Example 1

Titania according to the present invention was produced by the following procedures.

First of all, a titanium substrate (purity of 99.7 percent by weight) with a size of 5 cm×0.5 cm and a thickness of 1 mm was prepared and then subjected to ultrasonic cleaning in acetone for 5 minutes. Thereafter, the titanium substrate was placed in an electrolyte aqueous solution of 0.3 percent by volume of perchloric acid kept at a temperature of 16° C. and then anodized by applying a voltage of 20 V for 30 minutes thereby obtaining titania.

Figure 2:
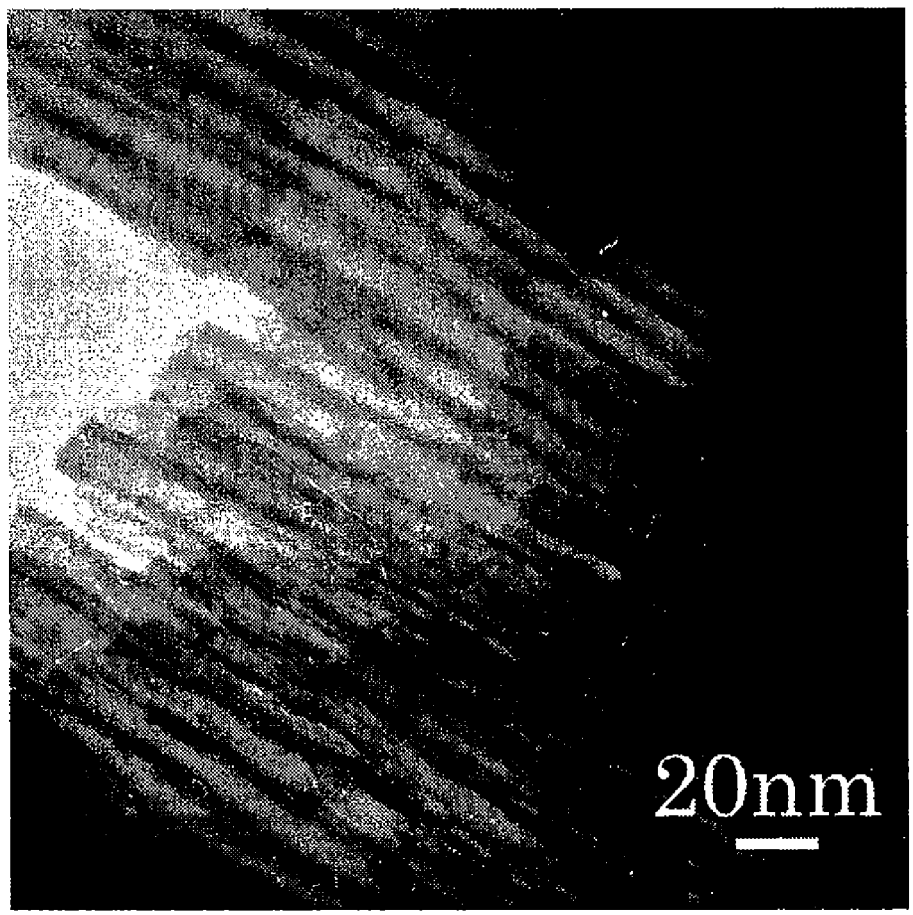
FIG. 2 is a photograph of the titania nanotube obtained in Example 1, taken with a transmission electron microscope.
Figure 3:
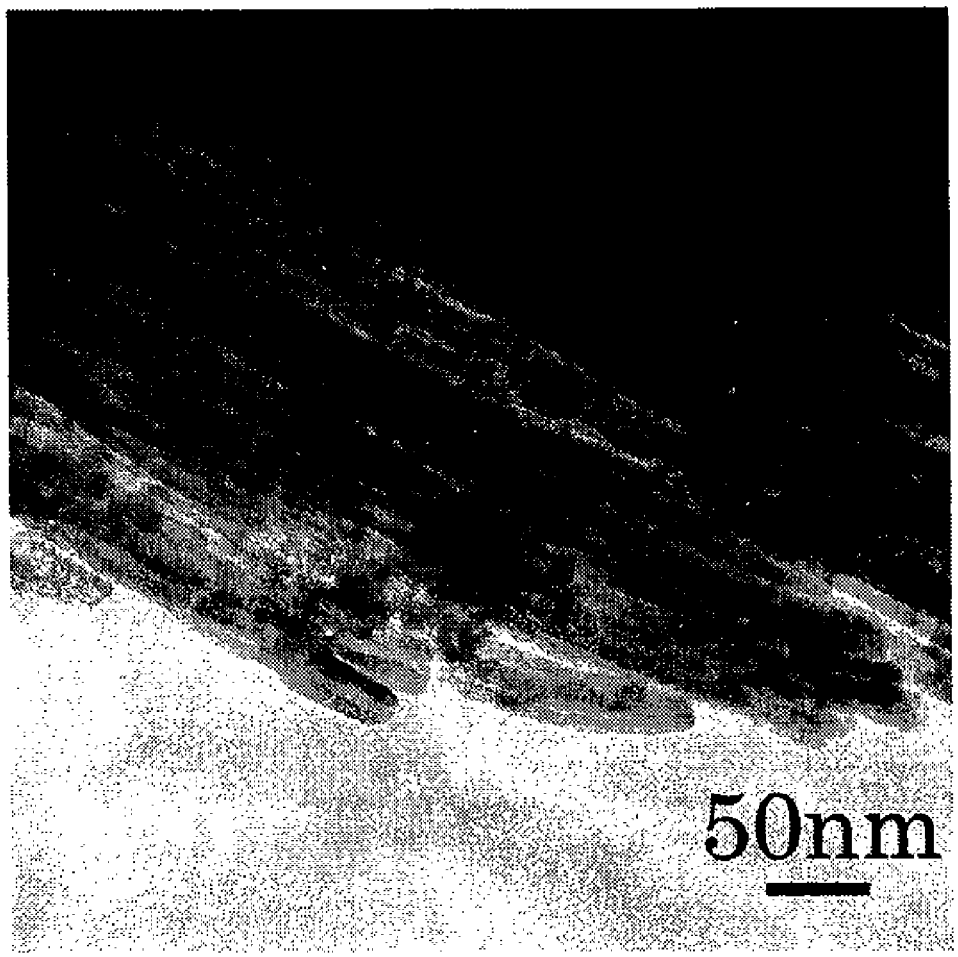
FIG. 3 is a photograph of the titania nanotube obtained in Example 1 after being heated, taken with a transmission electron microscope.
Figure 4:
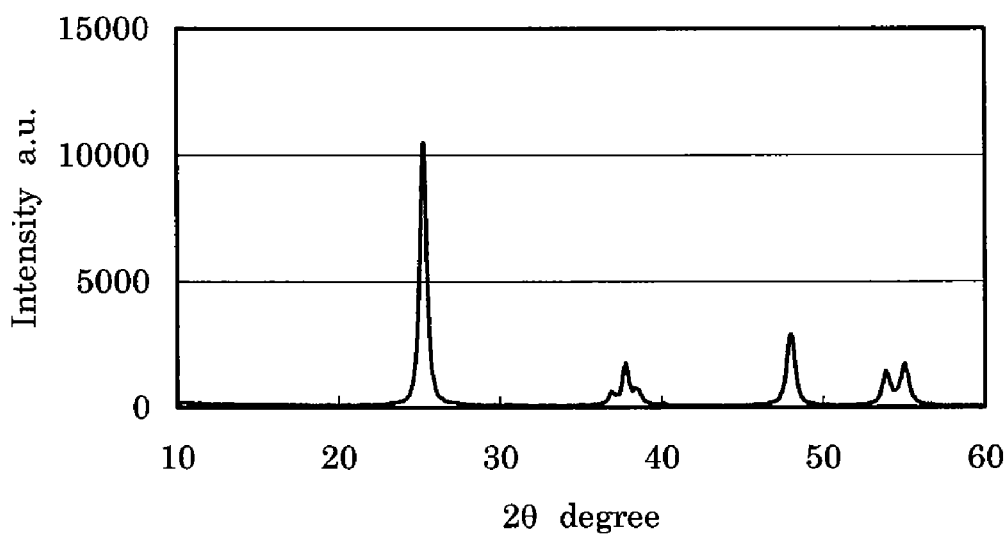
FIG. 4 is the X-ray structure analysis pattern of the titania nanotube obtained in Example 1 after being heated.

The resulting titania was observed using a scanning electron microscope. As a result, it was confirmed that the titania with a diameter of 40 nm and a length of 10 μm (aspect ratio of 250) was formed as shown in FIG. 1. When this titania and a sample obtained by heating the titania at a temperature of 500° C. for one hour were observed using a transmission electron microscope, it was confirmed that the titania prior to the heating had a tube-shaped structure with a wall thickness of on the order of 5 nm as shown in FIG. 2. It was also confirmed that the tube-shaped structure was maintained even after the heating as shown in FIG. 3. The titania was subjected to X-ray structure analysis before and after the heating. As a result, it was confirmed that the specific surface areas defined by nitrogen absorption of the titania before and after the heating were 275 $m^2/g$ and 195 $m^2/g$, respectively. FIG. 4 shows the X-ray structure analysis pattern of the titania after the heating.

Example 2

Titania according to the present invention was produced by the following procedures.

First of all, a titanium substrate (purity of 99.7 percent by weight) with a size of 5 cm×0.5 cm and a thickness of 1 mm was prepared. The titanium substrate was subjected to ultrasonic cleaning in acetone for 5 minutes, and one surface of the substrate was protected with epoxy. Thereafter, the titanium substrate was placed in an electrolyte aqueous solution of 0.3 percent by volume of perchloric acid and 0.05 percent by volume of hydrofluoric acid, kept at a temperature of 16° C. and anodized by applying a voltage of 15 V for 30 minutes thereby obtaining titania.

The resulting titania was observed using a scanning electron microscope and a transmission electron microscope. As a result, it was confirmed that titania nanotube with a diameter of 50 nm and a height of 5 μm (aspect ratio of 100) was formed.

Example 3

Titania according to the present inventions was prepared by the following procedures.

First of all, a titanium alloy substrate with a size of 5 cm×0.5 cm and a thickness of 1 mm (commercially pure titanium of JIS class 1) was prepared and subjected to ultrasonic cleaning in acetone for 5 minutes. The substrate was placed in an electrolyte aqueous solution obtained by dissolving titanium trichloride in a electrolyte aqueous solution of 0.03 percent by volume of perchloric acid to be 0.02 mol/L in concentration, kept at a temperature of 16° C. and anodized by applying a voltage of 20 V for 90 minutes thereby obtaining titania.

The resulting titania was observed using a scanning electron microscope. As a result, it was confirmed that titanium nanotube with a diameter of 30 nm and a height of 360 nm (aspect ratio of 12) was formed on the substrate.

Example 4

Titania according to the present invention was prepared by the following procedures.

First of all, titanium with a purity of 99.9 percent by weight was formed into a film with a thickness of 1.5 μm on an Indium Tin Oxide (ITO($In_2O_3$:Sn))-coated electrically conductive transparent glass substrate (10Ω/sq.) with a size of 5 cm×1.5 cm and a thickness of 2 mm by electron bean evaporation. Thereafter, the resulting titanium film on the substrate was subjected to ultrasonic cleaning in acetone for 5 minutes. The titanium film on the substrate was placed in an electrolyte aqueous solution of 0.1 percent by volume of perchloric acid and 0.1 mol/L of sulfuric acid, kept at a temperature of 16° C. and anodized by applying a voltage of 15 V for 45 minutes thereby obtaining titania.

The resulting titania was observed using a scanning electron microscope. As a result, it was confirmed that titania nanotube with a diameter of 30 nm and a height of 3 μm (aspect ratio of 100) was formed on the substrate.

Example 5

Titania according to the present invention was prepared by the following procedures.

First of all, a titanium substrate (purity of 99.7 percent by weight) with a size of 5 cm×0.5 cm and a thickness of 1 mm was prepared and subjected to ultrasonic cleaning in acetone for 5 minutes. A 0.04 mol/L titanium fluoride aqueous solution was prepared and then adjusted in pH to 2.0 with ammonia. The solution was kept at a temperature of 60° C. for 2 hours thereby obtaining titania particles. The titania particles were added to an electrolyte aqueous solution whose perchloric acid concentration was adjusted to 0.05 percent by volume, kept at a temperature of 40° C. Thereafter, the titanium substrate was placed in the electrolyte solution and anodized by applying a voltage of 18 V for 45 minutes thereby obtaining titania.

The resulting titania was observed using a scanning electron microscope. As a result, it was confirmed that titania nanotube with a diameter of 35 nm and a height of 1.5 μm (aspect ratio of 43) was formed on the substrate.

Comparative Example 1

Titania was prepared by the following procedures (see Non-Patent Document 4).

Titanium tetraisopropoxide was mixed with acetyl acetone of the same mole. The mixture was mixed with a 0.1 mol/L laurylamine hydrochloride aqueous solution so that the molar ratio of titanium to laurylamine is 4:1 and then allowed to stand at a temperature of 80° C. for 72 hours thereby obtaining titania. The resulting titania was observed using a transmission electron microscope. It was confirmed that most of the resulting titania was in the form of particles with a diameter of 5 nm, and only a few nanotube-shaped products were produced.

Comparative Example 2

Titania was prepared by the following procedures (see Non-Patent Document 5).

First of all, a titanium substrate (purity of 99.7 percent by weight) with a size of 5 cm×0.5 cm and a thickness of 1 mm was prepared and subjected to ultrasonic cleaning in acetone for 5 minutes. The titanium substrate was placed in an electrolyte aqueous solution of 0.5 percent by volume of hydrofluoric acid, kept at a temperature of 16° C. and anodized by applying a voltage of 20 V for 150 minutes thereby obtaining titania. The resulting titania was observed using a scanning electron microscope. As a result, it was confirmed that titania nanotube with a diameter of 120 nm and a height of 600 nm (aspect ratio of 5) was formed on the substrate. However, the height did not tend to increase although the anodization time was prolonged.

Example 6

Figure 5:
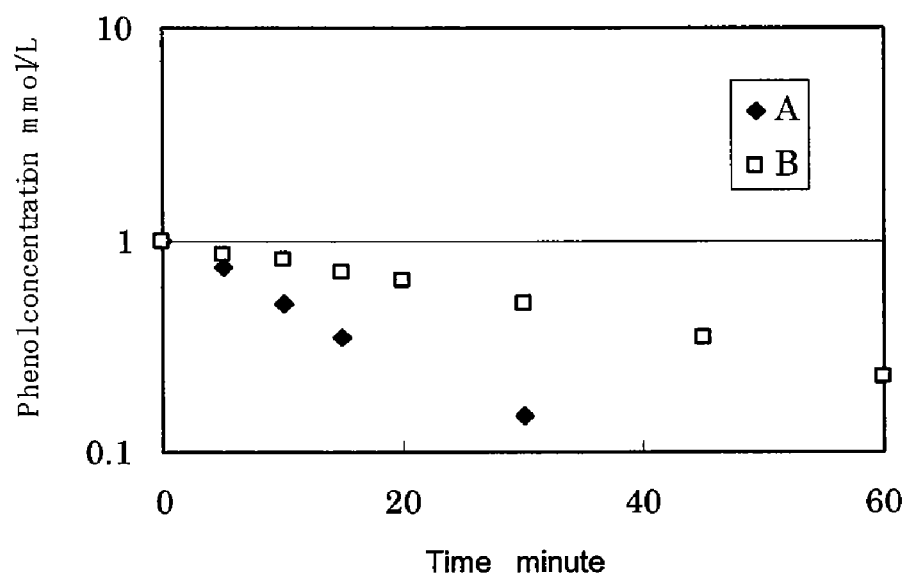
FIG. 5 shows the phenol decomposition characteristics of the titania nanotubes obtained in Example 6 and Comparative Example 3 upon light irradiation.

The titania obtained in Example 1 was heated at a temperature of 500° C. for one hour thereby obtaining a sample hereinafter referred to as "Sample A". 2.5 g of Sample A were dispersed in a 1 mmol/L phenol aqueous solution (pH 6.5) and subjected to light irradiation using a 100 W high-pressure mercury arc lamp, while circulating air at a rate 0.2 L/min to observe the change in phenol concentration. As a result, it was confirmed that Sample A exhibited excellent photocatalytic characteristics as shown in FIG. 5.

Comparative Example 3

Titania fine particle powder (P25: Nippon Aerosil Co., Ltd.) was heated at a temperature of 110° C. for 3 hours thereby obtaining a sample hereinafter referred to as "Sample B". Sample B was subjected to the same experiment as that conducted in Example 6. It was confirmed that Sample B exhibited excellent photocatalytic characteristics as shown in FIG. 5.

Example 7

After the titania obtained in Example 1 was dried at a temperature of 110° C., 25 g of the titania was weighed out. To the titania were added 0.4 ml acetic acid and 20 ml water, followed by dispersion using an ultrasonic homogenizer. Thereafter, to the mixture were added 2 ml of a 5-fold diluted surfactant (Triton X-100: Sigma), followed by defoaming using a defoaming mixer thereby obtaining a paste of titania nanotube. Separately, to 25 g of titania fine particle powder (P25: Nippon Aerosil Co., Ltd.) were added 0.4 ml of acetic acid, 20 ml of water, and zirconia beads (20 beads each with a diameter of 6 mm), followed by stirring for 3 hours. To the mixture were added 2 ml of a 5-fold diluted surfactant (Triton X-100: Sigma), followed by defoaming using a defoaming mixer and separation of the beads thereby obtaining a paste of titania fine particles. The titania fine particle paste was mixed with the titania nanotube paste in such an amount that the nanotube paste is contained in an amount of 20 percent by weight of the mixture thereby obtaining a titania paste. This titania paste was bar-coated on a 3 cm square $SnO_2$:F glass substrate (transparent electrically conductive glass obtained by forming an $SnO_2$:F film on a glass substrate) with a surface resistance of 12 Ω/sq and dried. Before the bar-coating, Scotch tape was applied at a width of 5 mm on the sides of the transparent electrically conductive glass so as to make the film thickness uniform. The coated glass was calcined at a temperature of 500° C. for 30 minutes. The film thickness after the calcination was measured with a needle-contact type film thickness measuring meter and found to be 10 μm. The glass substrate was dipped in a ruthenium dye (Ruthenium 535-bisTBA: SOLARONIX SA)/ethanol solution ($3.0 \times 10^{-4}$ mol/L) for 15 hours thereby forming a dye layer. The glass substrate was placed on the Pt film surface of a Pt film-coated glass substrate and dipped in a propylene carbonate solution of 0.3 mol/L of lithium iodide and 0.03 mol/L of iodine so that the solution was introduced into the space between the substrates by capillary action, and the peripheral thereof was sealed with an epoxy sealant. A lead wire was connected to the electrically conductive part of the transparent electrically conductive substrate and the counter electrode.

A pseudo sunlight (1 $kW/m^2$) was irradiated to the resulting cell so as to determine the current-voltage characteristics. It was confirmed that the cell exhibited excellent photoelectric conversion characteristics (photoelectric conversion efficiency: 6.9%).

Example 8

The titania obtained in Example 2 was heated at a temperature of 500° C. for one hour. The resulting titanium substrate was placed on a glass substrate with a Pt film so that the surface on which the titania nanotube was formed faced to the Pt film. The substrates were dipped in a propylene carbonate solution of 0.3 mol/L of lithium iodide and 0.03 mol/L of iodine so that the solution was introduced into the space between the substrates by capillary action, and the peripheral of the substrates was sealed with an epoxy sealant. A lead wire was connected to the titanium substrate and the counter electrode. A pseudo sunlight (1 $kW/m^2$) was irradiated from the platinum side to the resulting cell so as to determine the current-voltage characteristics. It was confirmed that the cell exhibited excellent photoelectric conversion characteristics (photoelectric conversion efficiency: 2.5%).

Comparative Example 4

The procedures of Example 7 were followed except that only the paste of the titania fine particles was used. The photoelectric conversion efficiency of the resulting cell was 5.2%.

Comparative Example 5

The procedures of Example 8 were followed except that only the paste of the titania fine particles was used. The photoelectric conversion efficiency of the resulting cell was 1.3%.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A nanotube-shaped titania with a diameter of 30 to 500 nm, a length of 0.9 to 100 μm and an aspect ratio of 30 or greater, obtained by anodizing a titanium metal or an alloy mainly containing titanium.

2. A catalyst comprising the nanotube-shaped titania according to claim 1 as a catalyst or a catalyst support.

3. The catalyst according to claim 2 wherein it is a photocatalyst.

4. A photoelectric conversion device wherein the nanotube-shaped titania according to claim 1 is used as an electrode material.

5. The photoelectric conversion device according to claim 4 wherein a dye is adsorbed on the surface of the titania.

6. A process for producing a nanotube-shaped titania with an aspect ratio of 6 or greater and a length of 0.9 to 100 μm, wherein a titanium metal or an alloy containing mainly titanium is anodized in an electrolyte solution containing a halogen atom-containing ion.

7. The process according to claim 6 wherein the anodization is carried out in the coexistence of a water-soluble titanium compound in the electrolyte solution containing a halogen atom-containing ion.

8. The process according to claim 6 wherein the anodization is carried out in the coexistence of an acid compound different from an acid or salt forming the halogen atom-containing ion, in the electrolyte solution containing a halogen atom-containing ion.

9. The process according to claim 6 wherein the anodization is carried out in the coexistence of titania fine particles in the electrolyte solution containing a halogen atom-containing ion.

10. The process according to claim 6 wherein the electrolyte solution is a perchloric acid aqueous solution.

11. A process of producing titania with improved crystallinity, wherein the titania produced by the process according to claim 6 is heated at a temperature of 100 to 1200° C. for 10 to 500 minutes.

* * * * *